(12) United States Patent
Dan

(10) Patent No.: US 9,105,895 B2
(45) Date of Patent: Aug. 11, 2015

(54) OPERATION METHOD AT THE TIME OF LOAD REDUCTION OF FUEL CELL SYSTEM

(75) Inventor: Koji Dan, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 696 days.

(21) Appl. No.: 12/738,505

(22) PCT Filed: Oct. 16, 2008

(86) PCT No.: PCT/JP2008/069169
§ 371 (c)(1),
(2), (4) Date: Apr. 16, 2010

(87) PCT Pub. No.: WO2009/054425
PCT Pub. Date: Apr. 30, 2009

(65) Prior Publication Data
US 2010/0221621 A1    Sep. 2, 2010

(30) Foreign Application Priority Data

Oct. 23, 2007    (JP) ................. 2007-275211

(51) Int. Cl.
*H01M 8/04* (2006.01)
*H01M 8/06* (2006.01)
*H01M 8/24* (2006.01)
*H01M 8/12* (2006.01)

(52) U.S. Cl.
CPC ........ *H01M 8/0625* (2013.01); *H01M 8/04007* (2013.01); *H01M 8/04089* (2013.01); *H01M 8/04365* (2013.01); *H01M 8/04373* (2013.01); *H01M 8/04388* (2013.01); *H01M 8/04395* (2013.01); *H01M 8/04425* (2013.01); *H01M 8/04492* (2013.01); *H01M 8/04559* (2013.01); *H01M 8/04619* (2013.01); *H01M 8/04731* (2013.01); *H01M 8/04753* (2013.01); *H01M 8/04776* (2013.01); *H01M 8/04828* (2013.01); *H01M 8/249* (2013.01); *H01M 2008/1293* (2013.01); *Y02E 60/50* (2013.01); *Y02E 60/525* (2013.01)

(58) Field of Classification Search
CPC ................... H01M 8/04559; H01M 8/04753; H01M 8/04089
USPC ................. 429/428, 430, 431, 432, 434, 444
See application file for complete search history.

(56) References Cited

U.S. PATENT DOCUMENTS

| 5,360,679 | A * | 11/1994 | Buswell et al. | 429/414 |
| 6,306,531 | B1 * | 10/2001 | Clingerman et al. | 429/416 |
| 6,777,122 | B2 * | 8/2004 | Okamoto | 429/425 |
| 7,122,259 | B2 * | 10/2006 | Takahashi | 429/429 |
| 2005/0074648 | A1 * | 4/2005 | Arthur | 429/26 |
| 2007/0202367 | A1 | 8/2007 | Yoshida | |

FOREIGN PATENT DOCUMENTS

| JP | 6-231790 | 8/1994 |
| JP | 7-22045 | 1/1995 |
| JP | 2003-86225 | 3/2003 |
| JP | 2006-32136 | 2/2006 |
| JP | 2006-92860 | 4/2006 |
| JP | 2006-302791 | 11/2006 |

OTHER PUBLICATIONS

Japanese Office Action for Application No. 2007-275211, dated Feb. 21, 2012.

* cited by examiner

*Primary Examiner* — Ladan Mohaddes
(74) *Attorney, Agent, or Firm* — Nelson Mullins Riley & Scarborough LLP; Anthony A. Laurentano

(57) ABSTRACT

An operation method at the time of load reduction of fuel cell system includes in this order a first step of determining a target power generation amount of the fuel cell module, a second step of increasing the flow rate of the oxygen-containing gas supplied to a fuel cell module, a third step of reducing the power generation amount of the fuel cell module, a fourth step of reducing the flow rate of the fuel gas supplied to the fuel cell module, a fifth step of reducing the flow rate of the water supplied to the fuel cell module, a sixth step of reducing the flow rate of the oxygen-containing gas supplied to the fuel cell module, and a seventh step of detecting whether the power generation amount of the fuel cell module reaches the target power generation amount or less.

13 Claims, 9 Drawing Sheets

FIG. 5

| | FUEL UTILIZATION RATIO | STACK TEMPERATURE | POSSIBILITY OF AIR DEPLETION | POSSIBILITY OF CARBON PRECIPITATION |
|---|---|---|---|---|
| INCREASE OXYGEN-CONTAINING GAS (INCREASE AIR) | ↑ | → | → | ↑ |
| REDUCE POWER GENERATION AMOUNT | → | ← | → | ↑ |
| REDUCE FUEL GAS (REDUCE RAW FUEL) | ← | → | → | → |
| REDUCE WATER | ↑ | ↑ | ↑ | ← |
| REDUCE OXYGEN-CONTAINING GAS (REDUCE AIR) | ↑ | ← | ← | ↑ |

← : UP
↑ : NO CHANGE
→ : DOWN ics, and a control device for controlling a power generation
amount of the fuel cell module.

OPERATION METHOD AT THE TIME OF LOAD REDUCTION OF FUEL CELL SYSTEM

RELATED APPLICATIONS

This application is a 35 U.S.C. 371 national stage filing of International Application No. PCT/JP2008/069169, filed on Oct. 16, 2008, which claims priority to Japanese Patent Application No. 2007-275211 filed on Oct. 23, 2007 in Japan. The contents of the aforementioned applications are hereby incorporated by reference.

TECHNICAL FIELD

The present invention relates to an operation method at the time of reduction in a load of a fuel cell system. The fuel cell system includes a fuel cell module for generating electricity by electrochemical reactions of a fuel gas and an oxygen-containing gas, a fuel gas supply apparatus for supplying a fuel gas to the fuel cell module, an oxygen-containing gas supply apparatus for supplying the oxygen-containing gas to the fuel cell module, a water supply apparatus for supplying water to the fuel cell module, a power converter for converting direct current electrical energy generated in the fuel cell module to electrical energy according to requirements specification, and a control device for controlling a power generation amount of the fuel cell module.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, normally, predetermined numbers of the electrolyte electrode assemblies and the separators are stacked together to form a fuel cell stack.

As the fuel gas supplied to the solid oxide fuel cell, normally, a hydrogen gas, CO, or methane generated from hydrocarbon raw material by a reformer is used. In general, in the reformer, a reformed raw material gas is obtained from hydrocarbon raw fuel of a fossil fuel or the like, such as methane or LNG, and the reformed raw material gas undergoes steam reforming, partial oxidation reforming, or autothermal reforming to produce a reformed gas (fuel gas).

In this type of the fuel cell, it is required to improve the performance of tracking the load at the time of load reduction. For example, a method of controlling a fuel cell power generation apparatus as disclosed in Japanese Laid-Open Patent Publication No. 07-022045 is known. As shown in FIG. 9, the fuel cell power generation apparatus includes a fuel cell 3 for performing power generation using an anode gas 1a containing hydrogen and a cathode gas 2a containing oxygen, a reformer 5 for burning an anode exhaust gas 1b discharged from the fuel cell 3 using some of a cathode exhaust gas 2b discharged from the fuel cell 3, and reforming the fuel gas containing water vapor 4 to produce an anode gas using the combustion heat, and a circulation line 7 for supplying a combustion exhaust gas 6 discharged from the reformer 5 to the cathode gas 2a supplied to the fuel cell 3.

Further, the fuel cell power generation apparatus includes a plurality of flow rate regulator valves 8a to 8d, and blowers 9a to 9c. The flow rate regulator valves 8a to 8d and the blowers 9a to 9d are controlled individually by feedback control. Further, based on output instructions at the time of load changes, the sizes of the openings of the flow rate regulator valves 8a to 8d and the rotation numbers of the blowers 9a to 9c in correspondence with the output instructions are calculated by an arithmetic and control device, and prior to the feedback control, the sizes of the openings of the flow rate regulator valves 8a to 8d and the rotation numbers of the blowers 9a to 9c are determined based on the calculation results.

Further, in a solid oxide fuel cell disclosed in Japanese Laid-Open Patent Publication No. 2003-086225, by directly using hydrocarbon fuel, partial oxidation reaction of the hydrocarbon fuel is used preferentially as power generation reaction. The solid oxide fuel cell includes a water vapor supply apparatus as means for supplying water vapor such that the ratio of steam (S) to carbon (c) (S/C) is regulated to be greater than 0, and 0.5 or less ($0<S/C \leq 0.5$). Further, the solid oxide fuel cell includes an adaptive control unit, a carbon deposition prediction/detection unit, and other fuel cells.

However, in Japanese Laid-Open Patent Publication No. 07-022045, though the feedback control is implemented by calculating the sizes of the openings of the flow rate regulator valves 8a to 8d and the rotation numbers of the blowers 9a to 9c based on the output instructions at the time of load changes, the order of these steps is not defined. Therefore, at the time of load reduction, for example, if the flow rate of the cathode gas 2a is reduced first, oxidation of the separator due to the excessive increase in the temperature of the fuel cell power generation apparatus, and degradation of the MEA due to air depletion may occur.

Further, Japanese Laid-Open Patent Publication No. 2003-086225 has an object of only suppressing carbon deposition at the time of load changes, and it is not possible to suitably solve problems other than carbon deposition, i.e., it is not possible to suppress excessive increase in the stack temperature, air depletion or the like. Therefore, for example, at the time of load reduction, if the flow rate of the fuel gas is reduced first, fuel depletion due to the excessive increase in the fuel utilization ratio may occur.

DISCLOSURE OF INVENTION

The present invention has been made to solve the problem of this type, and an object of the present invention is to provide an operation method at the time of load reduction in a fuel cell system which makes it possible to suppress excessive increase in the fuel utilization ratio, excessive increase in the fuel cell stack temperature, degradation of MEAs due to air depletion or carbon deposition, oxidation of separators or the like, while keeping load tracking ability.

The present invention relates to an operation method at the time of reduction in a load of a fuel cell system. The fuel cell system includes a fuel cell module for generating electricity by electrochemical reactions of a fuel gas and an oxygen-containing gas, a fuel gas supply apparatus for supplying the fuel gas to the fuel cell module, an oxygen-containing gas supply apparatus for supplying the oxygen-containing gas to the fuel cell module, a water supply apparatus for supplying water to the fuel cell module, a power converter for converting direct current electrical energy generated in the fuel cell module to electrical energy according to requirements specification, and a control device for controlling a power generation amount of the fuel cell module.

The operation method includes a first step of determining a target power generation amount of the fuel cell module, a second step of increasing the flow rate of the oxygen-containing gas supplied to the fuel cell module, a third step of reducing the power generation amount of the fuel cell module after the second step is started, a fourth step of reducing the flow rate of the fuel gas supplied to the fuel cell module after the third step is started, a fifth step of reducing the flow rate of the water supplied to the fuel cell module after the fourth step is started, a sixth step of reducing the flow rate of the oxygen-containing gas supplied to the fuel cell module after the fifth step is started, and a seventh step of detecting whether the power generation amount of the fuel cell module reaches the target power generation amount or less after the sixth step is started.

The fuel gas herein includes any gases usable as a fuel, for example, raw fuels such as the city gas (containing $CH_4$, $C_2H_6$, $C_3H_8$, and $C_4H_{10}$) in addition to the reformed gas produced by reforming of the reformer.

In the present invention, operation is performed in the order of the step of increasing the flow rate of the oxygen-containing gas, the step of reducing the power generation amount, the step of reducing the flow rate of the fuel gas, the step of reducing the flow rate of the water, and the step of reducing the flow rate of the oxygen-containing gas. Therefore, it becomes possible to suppress excessive increase in the fuel utilization ratio, excessive increase in the fuel cell stack temperature, degradation of MEAs due to air depletion or carbon deposition, oxidation of separators or the like. Thus, improvement in the reliability and durability for tracking the load at the time of load reduction is achieved.

The above and other objects, features and advantages of the present invention will become more apparent from the following description when taken in conjunction with the accompanying drawings in which preferred embodiments of the present invention are shown by way of illustrative example.

BRIEF DESCRIPTION OF DRAWINGS

FIG. 5 is a table showing phenomena at the time of performing various reduction steps;

BEST MODE FOR CARRYING OUT THE INVENTION

Figure 1:
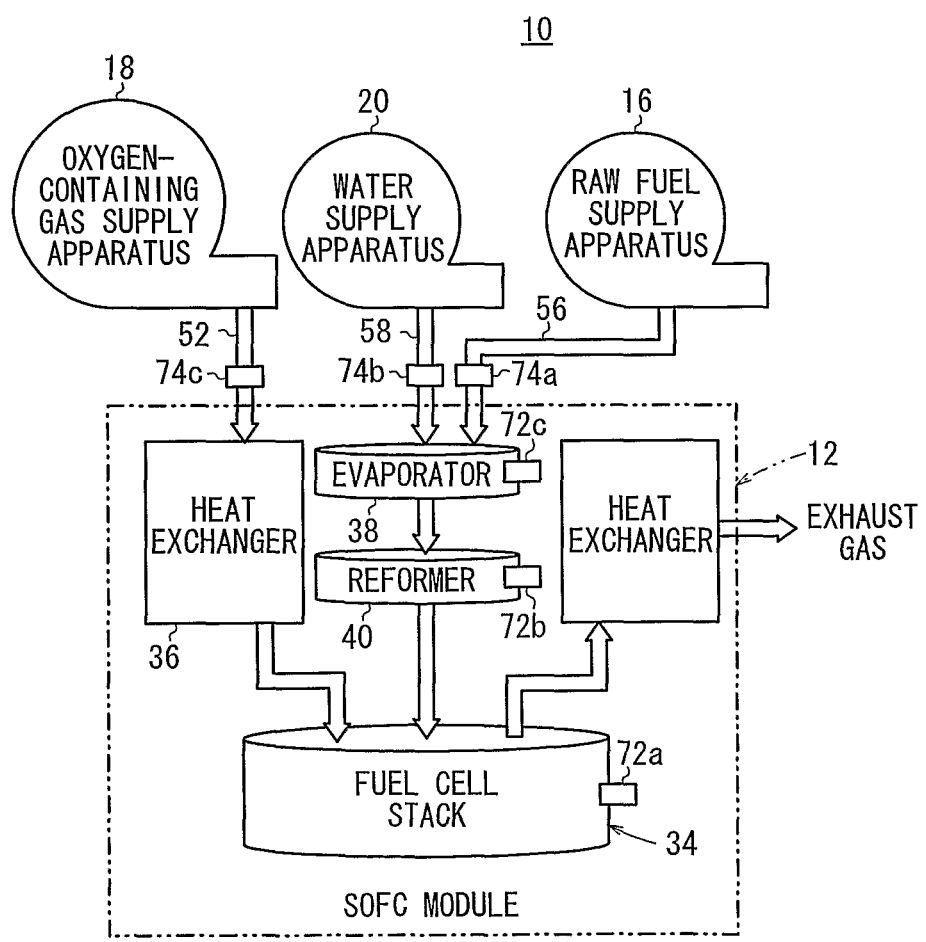
FIG. 1 is a diagram schematically showing a mechanical circuit of a fuel cell system to which an operation method at the time of load reduction according to an embodiment of the present invention is applied.
Figure 2:
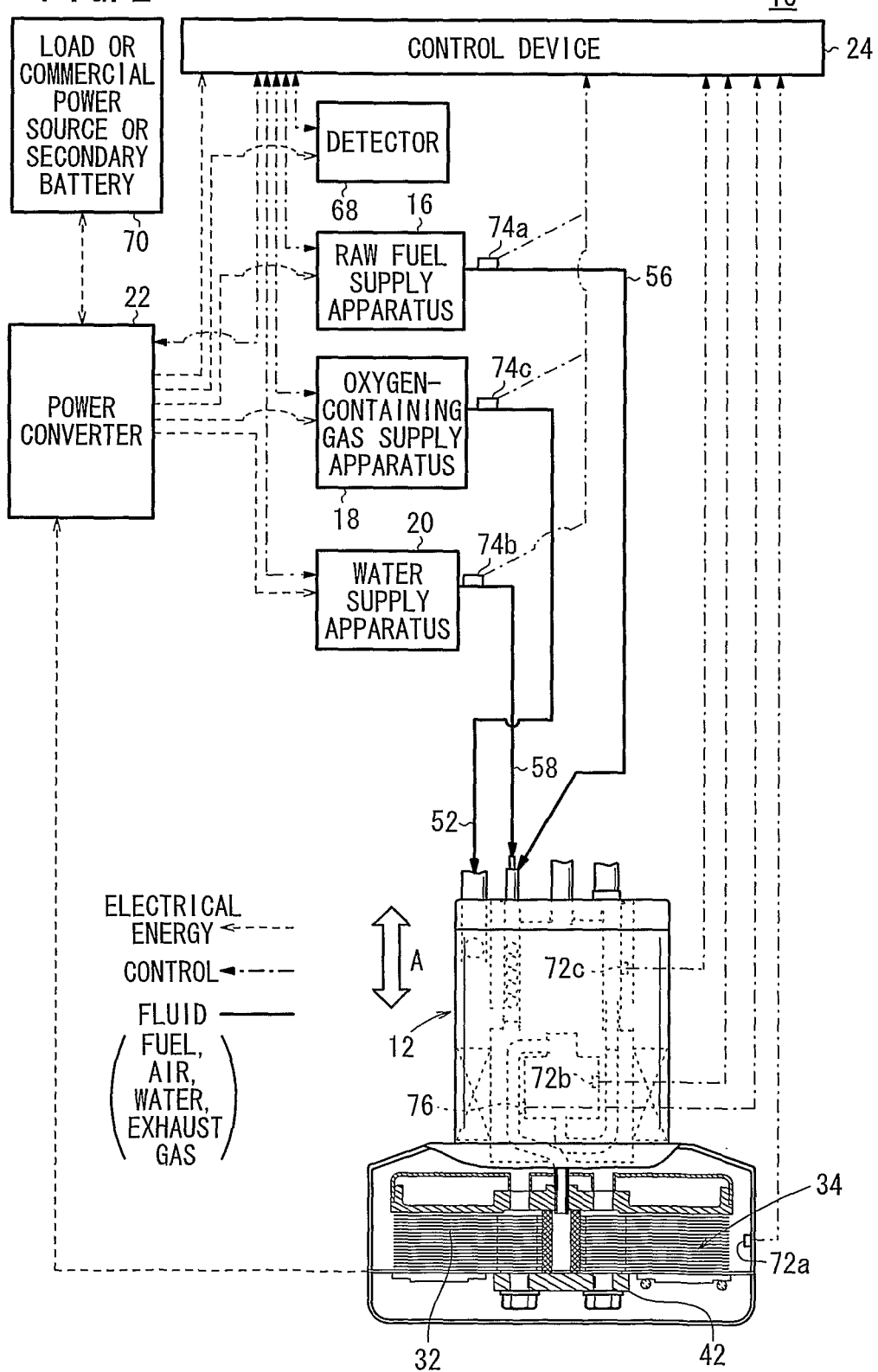
FIG. 2 is a circuit diagram showing the fuel cell system.

FIG. 1 is a diagram schematically showing a mechanical circuit of a fuel cell system 10 to which an operation method at the time of load reduction according to an embodiment of the present invention is applied. FIG. 2 is a circuit diagram showing the fuel cell system 10.

The fuel cell system 10 is used in various applications, including stationary and mobile applications. For example, the fuel cell system 10 is mounted on a vehicle. The fuel cell system 10 includes a fuel cell module (SOFC module) 12 for generating electrical energy in power generation by electrochemical reactions of a fuel gas (hydrogen gas) and an oxygen-containing gas (air), a raw fuel supply apparatus (including a fuel gas pump) 16 for supplying a raw fuel (e.g., city gas) to the fuel cell module 12, an oxygen-containing gas supply apparatus (including an air pump) 18 for supplying an oxygen-containing gas to the fuel cell module 12, a water supply apparatus (including a water pump) 20 for supplying water to the fuel cell module 12, a power converter 22 for converting the direct current electrical energy generated in the fuel cell module 12 to electrical energy according to the requirements specification, and a control device 24 for controlling the amount of electrical energy generated in the fuel cell module 12.

Figure 3:
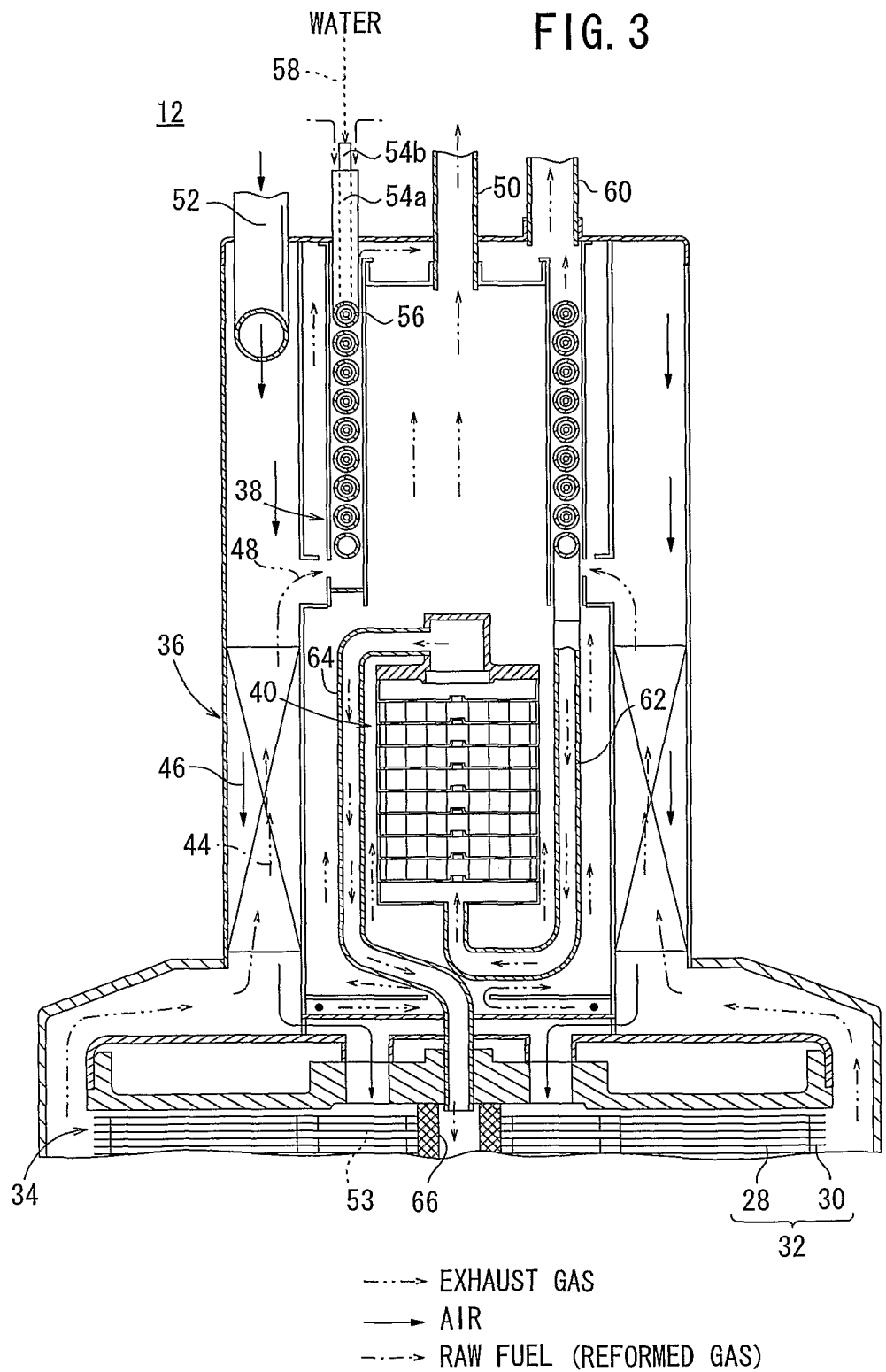
FIG. 3 is a cross sectional view showing main components of a fuel cell module of the fuel cell system.

As shown in FIG. 3, the fuel cell module 12 includes a fuel cell stack 34 formed by stacking a plurality of solid oxide fuel cells 32 in a vertical direction. The fuel cells 32 are formed by stacking electrolyte electrode assemblies 28 and separators 30. Though not shown, each of the electrolyte electrode assemblies 28 includes a cathode, an anode, and an electrolyte (solid oxide) interposed between the cathode and the anode. For example, the electrolyte is made of ion-conductive solid oxide such as stabilized zirconia.

At an upper (or lower) end of the fuel cell stack 34 in the stacking direction, a heat exchanger 36 for heating the oxygen-containing gas before the oxygen-containing gas is supplied to the fuel cell stack 34, an evaporator 38 for evaporating water to produce a mixed fuel of the raw fuel and water vapor, and a reformer 40 for reforming the mixed fuel to produce a reformed gas are provided (see FIGS. 1 and 3).

At a lower (or upper) end of the fuel cell stack 34 in the stacking direction, a load applying mechanism 42 for applying a tightening load to the fuel cells 32 of the fuel cell stack 34 in the direction indicated by the arrow A is provided (see FIG. 2).

The reformer 40 is a preliminary reformer for producing a fuel gas chiefly containing methane ($CH_4$), hydrogen, and CO by reforming higher hydrocarbon ($C_{2+}$) such as ethane ($C_2H_6$), propane ($C_3H_8$), and butane ($C_4H_{10}$) in the city gas (raw fuel) by steam reforming. The operating temperature of the reformer 40 is several hundred ° C.

The operating temperature of the fuel cell 32 is high, at several hundred ° C. In the electrolyte electrode assembly 28, methane in the fuel gas is reformed to obtain hydrogen and CO, and the hydrogen and CO are supplied to the anode.

As shown in FIG. 3, the heat exchanger 36 has a first exhaust gas channel 44 as a passage of a consumed reactant gas discharged from the fuel cell stack 34 (hereinafter also referred to as the exhaust gas) and an air channel 46 as a passage of the air for allowing the air as heated fluid to flow in a counterflow manner with respect to the exhaust gas. The first exhaust gas channel 44 is connected to a second exhaust gas channel 48 for supplying the exhaust gas to the evaporator 38 as a heat source for evaporating water. The first exhaust gas channel 44 is connected to an exhaust gas pipe 50. The upstream side of the air channel 46 is connected to an air supply pipe 52, and the downstream side of the air channel 46 is connected to an oxygen-containing gas supply passage 53 of the fuel cell stack 34.

The evaporator 38 has dual pipe structure including an outer pipe member 54a and an inner pipe member 54b provided coaxially. The dual pipe is provided in the second exhaust gas channel 48. A raw fuel channel 56 is formed between the outer pipe member 54a and the inner pipe member 54b. Further, a water channel 58 is formed in the inner pipe member 54b. The second exhaust gas channel 48 of the evaporator 38 is connected to a main exhaust pipe 60.

The outer pipe member 54a is connected to a mixed fuel supply pipe 62 coupled to an inlet of the reformer 40. One end of a reformed gas supply channel 64 is coupled to an outlet of the reformer 40, and the other end of the reformed gas supply channel 64 is connected to the fuel gas supply passage 66 of the fuel cell stack 34. Instead of the dual pipe structure, the evaporator 38 may include a heater and a mixer (e.g., ejector type mixer).

As shown in FIGS. 1 and 2, the raw fuel supply apparatus 16 is connected to the raw fuel channel 56. The oxygen-containing gas supply apparatus 18 is connected to the air supply pipe 52, and the water supply apparatus 20 is connected to the water channel 58.

The raw fuel supply apparatus 16, the oxygen-containing gas supply apparatus 18, and the water supply apparatus 20 are controlled by the control device 24. A detector 68 for detecting the fuel gas is electrically connected to the control device 24. For example, a commercial power source 70 (or load, secondary battery, or the like) is connected to the power converter 22.

As shown in FIGS. 1 and 2, the fuel cell system 10 includes a first temperature sensor 72a for detecting the temperature of the fuel cell stack 34, a second temperature sensor 72b for detecting the temperature of the reformer 40, a third temperature sensor 72c for detecting the temperature of the evaporator 38, a first flow rate sensor 74a for detecting the flow rate of the raw fuel (fuel gas) supplied from the raw fuel supply apparatus 16 to the evaporator 38, a second flow rate sensor 74b for detecting the flow rate of the water supplied from the water supply apparatus 20 to the evaporator 38, and a third flow rate sensor 74c for detecting the flow rate of the air (oxygen-containing gas) supplied from the oxygen-containing gas supply apparatus 18 to the heat exchanger 36. The first temperature sensor 72a, the second temperature sensor 72b, the third temperature sensor 72c, the first flow rate sensor 74a, the second flow rate sensor 74b, and the third flow rate sensor 74c are connected to the control device 24.

Operation of the fuel cell system 10 will be described below.

As shown in FIGS. 1 and 2, by operation of the raw fuel supply apparatus 16, for example, a raw fuel such as the city gas (including $CH_4$, $C_2H_6$, $C_3H_8$, $C_4H_{10}$) is supplied to the raw fuel channel 56. Further, by operation of the water supply apparatus 20, water is supplied to the water channel 58, and the oxygen-containing gas such as the air is supplied to the air supply pipe 52 through the oxygen-containing gas supply apparatus 18.

As shown in FIG. 3, in the evaporator 38, the raw fuel flowing through the raw fuel channel 56 is mixed with the water vapor, and a mixed fuel is obtained. The mixed fuel is supplied to the inlet of the reformer 40 through the mixed fuel supply pipe 62. The mixed fuel undergoes steam reforming in the reformer 40. Thus, hydrocarbon of $C_{2+}$ is removed (reformed), and a reformed gas chiefly containing methane is obtained. The reformed gas flows through the reformed gas supply channel 64 connected to the outlet of the reformer 40, and then supplied to the fuel gas supply passage 66 of the fuel cell stack 34. Thus, the methane in the reformed gas is reformed, and the hydrogen gas and CO are obtained. The fuel gas chiefly containing the hydrogen gas and CO is supplied to the anode (not shown).

The air supplied from the air supply pipe 52 to the heat exchanger 36 moves along the air channel 46 in the heat exchanger 36, and heated to a predetermined temperature by heat exchange with the exhaust gas moving along the first exhaust gas channel 44 as described later. The air heated by the heat exchanger 36 is supplied to the oxygen-containing gas supply passage 53 of the fuel cell stack 34, and the air is supplied to the cathode (not shown).

Thus, in the electrolyte electrode assembly 28, by electrochemical reactions of the fuel gas and the air, power generation is performed. The hot exhaust gas (several hundred ° C.) discharged to the outer circumferential region of each of the electrolyte electrode assemblies 28 flows through the first exhaust gas channel 44 of the heat exchanger 36, and heat exchange with the air is carried out. The air is heated to a predetermined temperature, and the temperature of the exhaust gas is decreased.

When the exhaust gas moves along the second exhaust gas channel 48, the water passing through the water channel 58 is evaporated. After the exhaust gas passes through the evaporator 38, the exhaust gas is discharged to the outside through the main exhaust pipe 60.

Next, an operation method at the time of load reduction according to the first embodiment will be described with reference to a flow chart shown in FIG. 4 and a table shown in FIG. 5 showing phenomena resulting from various reduction steps.

At the time of load reduction of the fuel cell system 10, normally, steps of reducing the flow rates of the raw fuel, the water, and the air and reducing the power generation amount are performed. At this time, for example, it is likely that the fuel utilization ratio is increased excessively, the stack temperature is increased excessively, and air depletion and carbon deposition occur.

Specifically, as shown in FIG. 5, when the power generation amount is reduced, the fuel utilization ratio and the possibility of air depletion are lowered, and the stack temperature is increased. Further, when the flow rate of the raw fuel is reduced, the stack temperature, the possibility of air depletion, and the possibility of carbon deposition are lowered, and the fuel utilization ratio is increased. Further, when the flow rate of the water is reduced, the possibility of carbon deposition is increased, and when the flow rate of the air is reduced, the stack temperature and the possibility of air depletion are lowered.

When the fuel utilization ratio is increased excessively, excessive oxygen ions are present, and the oxygen ions move toward the anode. Under the circumstances, the anode tends to be oxidized easily, and the electrolyte electrode assembly 28 may be degraded undesirably. Further, due to the excessive increase in the stack temperature, the separator 30 may be oxidized undesirably. Due to air depletion, reduction of the cathode occurs, and the electrolyte electrode assembly 28 may be degraded undesirably. Further, due to carbon deposition, the electrolyte electrode assembly 28 may be degraded undesirably.

In this case, the fuel utilization ratio can be calculated based on the flow rate of the raw fuel supplied from the raw fuel supply apparatus 16 (flow rate detected by the first flow rate sensor 74a) and the electrical current of the fuel cell module 12. The air depletion can be calculated from A (air)/F (raw fuel), based on the flow rate of the raw fuel supplied from the raw fuel supply apparatus 16 (flow rate detected by the first flow rate sensor 74a), the flow rate of the air supplied from the oxygen-containing gas supply apparatus 18 (flow rate detected by the third flow rate sensor 74c), and the electrical current of the fuel cell module 12.

Further, the carbon deposition can be determined from S (steam)/C (carbon) (molar ratio), based on the flow rate of the raw fuel supplied from the raw fuel supply apparatus 16 (flow rate detected by the first flow rate sensor 74a) and the flow rate of the water supplied from the water supply apparatus 20 (flow rate detected by the second flow rate sensor 74b).

For example, the fuel utilization ratio may be regulated to be within a range of 80% or less, and for example, the stack temperature may be regulated to be within a range of 600° C. to 800° C. In order to prevent air depletion, for example, A/F is regulated to be 2.4 or more (A/F≥2.4). In order to prevent carbon deposition, for example, S/C is regulated to be 1.0 or more (S/C≤1.0).

Figure 4:
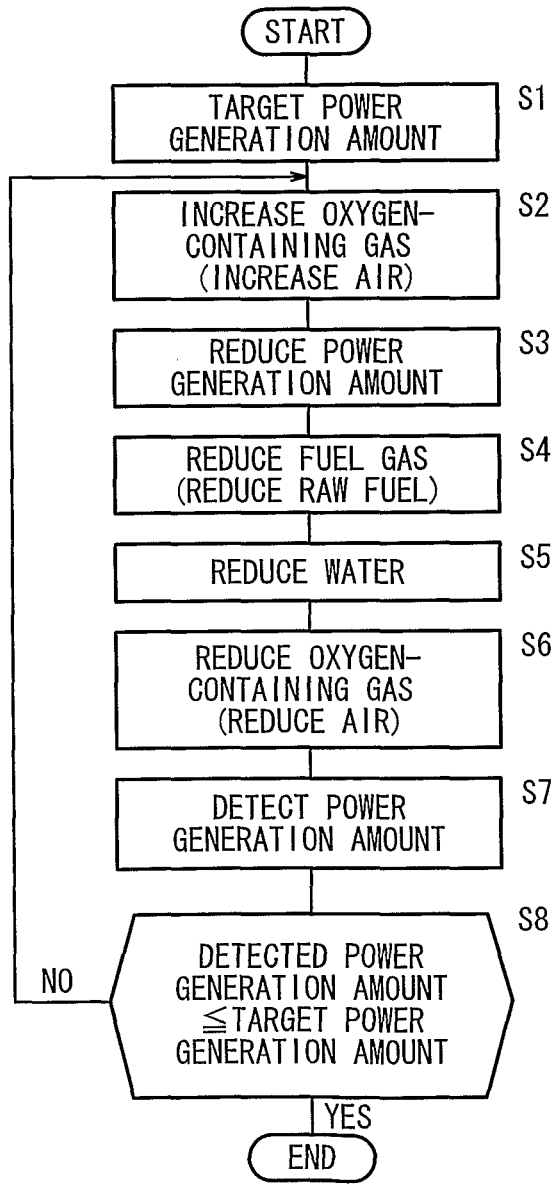
FIG. 4 is a flow chart showing the operation method at the time of load reduction according to the first embodiment.

At the time of load reduction of the fuel cell system 10, firstly, a target power generation amount of the fuel cell module 12 is determined (step S1 in FIG. 4). Then, by controlling operation of the oxygen-containing gas supply apparatus 18, the flow rate of the air supplied to the heat exchanger 36 is increased (step S2).

Figure 6:
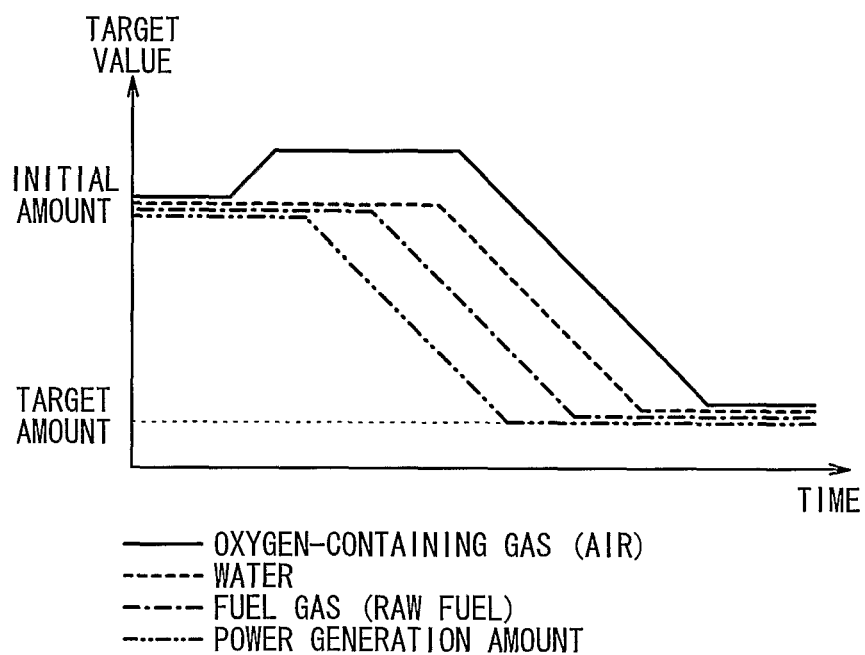
FIG. 6 is a graph showing the operation method at the time of load reduction according to the first embodiment.

Then, after the power generation amount of the fuel cell module 12 is reduced (step S3), by controlling operation of the raw fuel supply apparatus 16, the flow rate of the raw fuel supplied to the evaporator 38 is reduced (step S4). Then, the process proceeds to step S5 for reducing the flow rate of the water supplied to the evaporator 38, and then, the flow rate of the oxygen-containing gas supplied to the heat exchanger 36 is reduced (step S6). As shown in FIG. 6, the flow rate of the air is increased or reduced continuously, and the flow rates of the water, the raw fuel, and the power generation amount are reduced continuously.

When the power generation amount of the fuel cell module 12 is detected (step S7), the control device 24 determines whether the detected power generation amount has reached the target power generation amount or not (step S8). At this time, if the control device 24 determines that the actual power generation amount exceeds the target power generation amount (NO in step S8), the process returns to step S2 to carry out the above steps successively. If the control device 24 determines that the actual power generation amount has reached the target power generation amount or less (YES in step S8), the steps at the time of load reduction of the fuel cell system 10 are finished.

In this case, at the time of load reduction of the fuel cell system 10, if the flow rate of the air is increased, as shown in FIG. 5, it is likely that the stack temperature, and the possibility of air depletion are lowered, and the fuel utilization ratio and the possibility of carbon deposition remain the same.

Further, if the power generation amount of the fuel cell module 12 is reduced, though the fuel utilization ratio and the possibility of air depletion are lowered, the stack temperature is increased easily. Further, if the flow rate of the raw fuel is reduced, the stack temperature, the possibility of air depletion and the possibility of carbon deposition are lowered, and the fuel utilization ratio is increased easily. Further, if the flow rate of the water is reduced, the possibility of carbon deposition becomes high. Further, if the flow rate of the air is reduced, the stack temperature and the possibility of air depletion become high.

In the first embodiment, in order to suppress the increase in the stack temperature which tends to occur as the decrease in the power generation amount of the fuel cell module 12, firstly, the step of increasing the flow rate of the air supplied to the fuel cell module 12 is performed. Then, in order to suppress the excessive increase in the fuel utilization ratio which tends to occur as the reduction in the flow rate of the raw fuel, the step of reducing the power generation amount of the fuel cell module 12 is performed.

Further, in order to suppress the increase in the possibility of the carbon deposition which tends to occur as the reduction in the flow rate of the water, the step of reducing the flow rate of the raw fuel is performed. Further, in the step of reducing the flow rate of the air, the stack temperature tends to be increased, and the possibility of air deletion becomes high. Therefore, the step of increasing the flow rate of the air and the step of reducing the raw fuel for lowering the stack temperature, and the step of increasing the flow rate of the air, the step of reducing the power generation amount, and the step of reducing the flow rate of the raw fuel for lowering the possibility of air depletion are performed beforehand.

As describe above, in the step of reducing the power generation amount, since the step of increasing the flow rate of the air is finished beforehand, oxidation of the separator 30 due to the excessive increase in the stack temperature is suppressed. Thus, improvement in the reliability and durability for tracking the load at the time of load reduction is achieved.

Further, before the step of reducing the flow rate of the raw fuel, the step of reducing the power generation amount is performed. Therefore, it is possible to suppress degradation of the electrolyte electrode assembly 28 due to the excessive increase in the fuel utilization ratio. Thus, improvement in the reliability and durability for tracking the load at the time of load reduction is achieved.

Further, the step of reducing the flow rate of the water is performed after the step of reducing the flow rate of the raw fuel. In this manner, it is possible to suppress degradation of the electrolyte electrode assembly 28 due to carbon deposition. Further, the step of reducing the flow rate of the air is performed after the step of increasing the flow rate of the air, the step of reducing the power generation amount, and the step of reducing the flow rate of the raw fuel. Therefore, oxidation of the separator 30 due to the excessive increase in the temperature of the fuel cell stack 34 and degradation of the electrolyte electrode assembly 28 due to air depletion are suppressed. Thus, improvement in the reliability and durability for tracking the load at the time of load reduction is achieved.

Further, in the first embodiment, as shown in FIG. 6, the flow rate of the air is increased or reduced continuously under control. The flow rates of the water and the raw fuel, and the power generation amount are increased, or reduced continuously under control. Thus, tracking of the load at the time of load reduction is carried out easily and efficiently.

Further, the step of reducing the power generation amount of the fuel cell module 12 (step S3) is performed when it is determined that the temperature of the fuel cell stack 34 (temperature detected by the first temperature sensor 72*a*) is within a predetermined temperature range. In this manner, it is possible to reduce the power generation amount while suppressing oxidation of the separator 30 by the excessive increase in the temperature of the fuel cell module 12.

Further, the step of reducing the flow rate of the raw fuel is performed when it is determined that the fuel cell utilization ratio of the fuel cell module 12 is within a predetermined range based on at least one of the flow rate of the raw fuel supplied to the fuel cell module 12 (flow rate detected by the first flow rate sensor 74*a*) and the electrical current of the fuel cell module 12. In this manner, it is possible to reduce the flow rate of the raw fuel while suppressing degradation of the electrolyte electrode assembly 28 due to excessive increase in the fuel utilization ratio.

Further, the step of reducing the water supplied to the fuel cell module 12 (step S5) is performed when it is determined that carbon deposition does not occur in the fuel cell module 12 based on at least one of the flow rate of the raw fuel supplied to the fuel cell module 12 (flow rate detected by the first flow rate sensor 74*a*), the flow rate of the water supplied to the fuel cell module 12 (flow rate detected by the second flow rate sensor 74*b*), the temperature of the evaporator 38 (temperature detected by the third temperature sensor 72*c*)

and the temperature of the reformer 40 (temperature detected by the second temperature sensor 72b). In this manner, it is possible to reduce the flow rate of the water while suppressing degradation of the electrolyte electrode assembly 28 due to carbon deposition.

Further, the step of reducing the flow rate of the air supplied to the fuel cell module 12 (step S6) is performed when it is determined that the temperature of the fuel cell stack 34 (temperature detected by the first temperature sensor 72a) is within a predetermined temperature range. In this manner, it is possible to reduce the flow rate of the air while suppressing oxidation of the separator 30 due to excessive increase in the temperature of the fuel cell stack 34. The step of reducing the flow rate of the air is performed when it is determined that air depletion does not occur in the fuel cell module 12 based on at least one of the flow rate of the air supplied to the fuel cell module 12 (flow rate detected by the third flow rate sensor 74c), the flow rate of the raw fuel supplied to the fuel cell module 12 (flow rate detected by the first flow rate sensor 74a) and the electrical current of the fuel cell module 12. In this manner, it is possible to reduce the flow rate of the air, while suppressing degradation of the electrolyte electrode assembly 28 due to air depletion.

Further, when it is determined that the actual power generation amount exceeds the target power generation amount (NO in step S8), the process returns to step S2. In this manner, at the time of load reduction, it becomes possible to accurately track the load without impairing the reliability and durability.

Further, the fuel cell module 12 adopts the solid oxide fuel cell 32. The operating temperature of the solid oxide fuel cell 32 is high, and the temperature changes in a relatively wide range at the time of load reduction. Thus, the fuel cell module 12 is suitable for the fuel cell 32.

Figure 7:
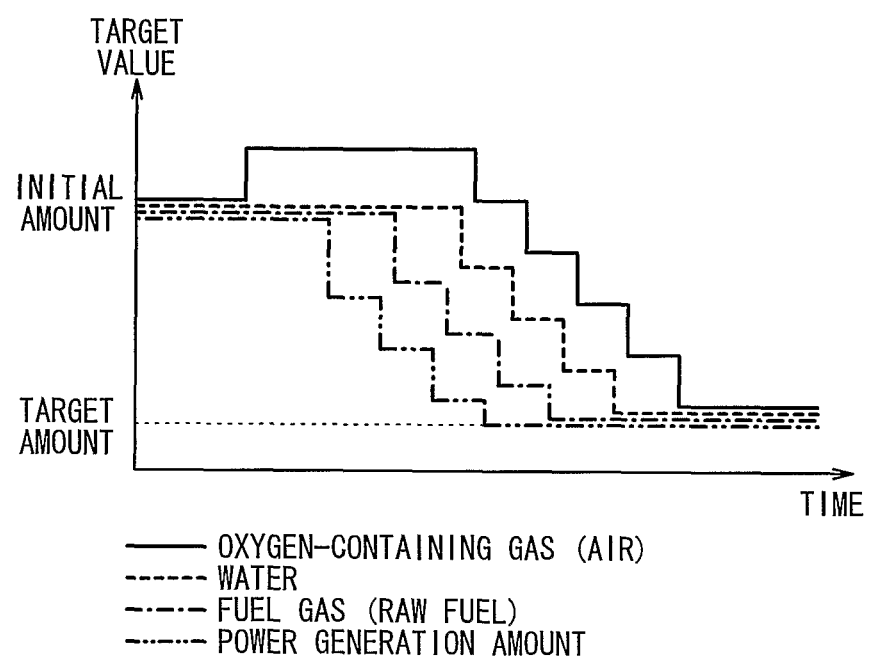
FIG. 7 is a graph showing an operation method at the time of load reduction according to a second embodiment.

FIG. 7 is a graph showing an operating method at the time of load reduction according to a second embodiment of the present invention.

In the second embodiment, the flow rate of the air is increased and reduced step by step, and the flow rates of the water and the raw fuel, and the power generation amount are reduced step by step. In the second embodiment, the same advantages as in the case of the first embodiment are obtained. For example, improvement in the reliability and durability for tracking the load at the time of load reduction is achieved.

Figure 8:
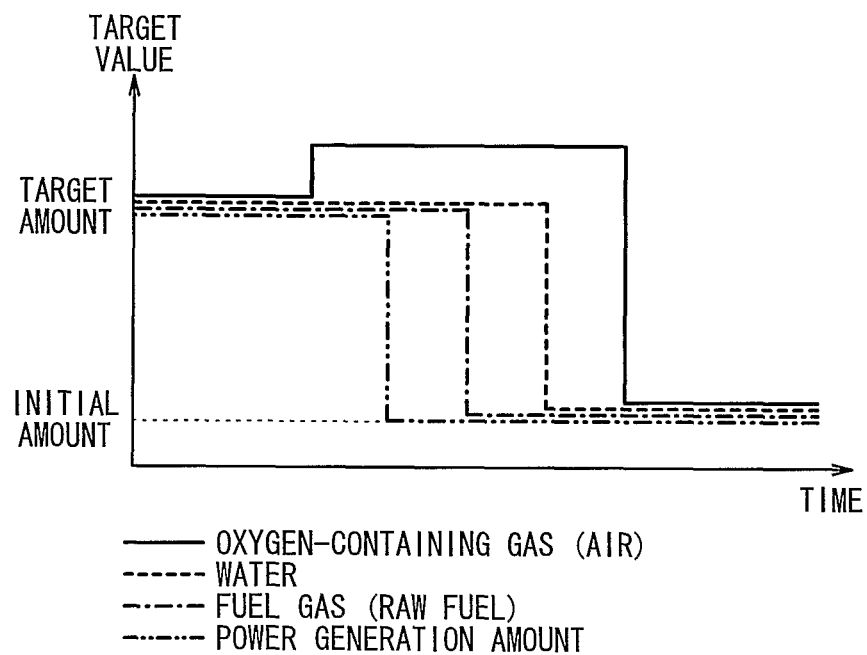
FIG. 8 is a graph showing an operation method at the time of load reduction according to a third embodiment.
Figure 9:
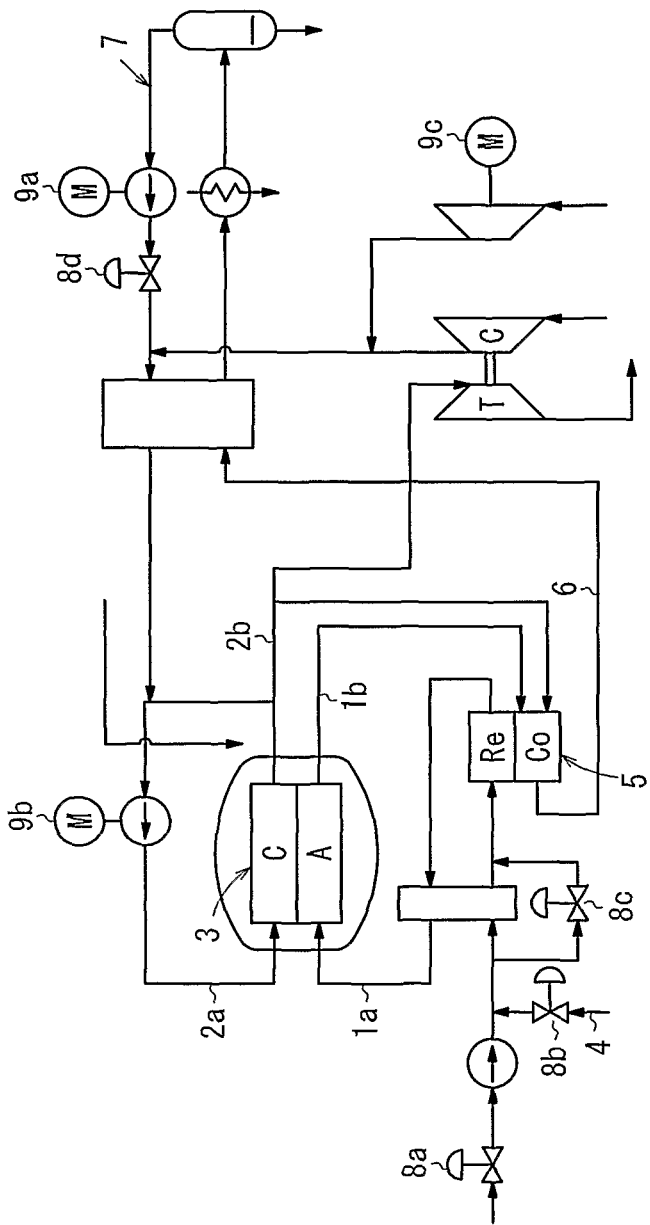
FIG. 9 is a diagram showing a method of controlling a fuel cell power generation apparatus disclosed in Japanese Laid-Open Patent Publication No. 07-022045.

FIG. 8 is a graph showing an operating method at the time of load reduction according to a third embodiment of the present invention.

In the third embodiment, the flow rate of the air is increased and reduced stepwise, and the flow rates of the water and the raw fuel, and the power generation amount are reduced stepwise. In the third embodiment, the same advantages as in the case of the first and second embodiments are obtained. For example, tracking of the load at the time of load reduction is carried out easily and efficiently.

Although the invention has been particularly shown and described with reference to preferred embodiments, it will be understood that variations and modifications can be effected thereto by those skilled in the art without departing from the spirit and scope of the invention as defined by the appended claims.

The invention claimed is:

1. An operation method at the time of reduction in a load of a fuel cell system, the fuel cell system comprising:
a fuel cell module for generating electricity by electrochemical reactions of a fuel gas and an oxygen-containing gas, the fuel cell module comprising:
a fuel cell stack formed by stacking a plurality of fuel cells, the fuel cells each formed by stacking an electrolyte electrode assembly and a separator, the electrolyte electrode assembly including an anode, a cathode, and an electrolyte interposed between the anode and the cathode;
a heat exchanger for heating the oxygen-containing gas before the oxygen-containing gas is supplied to the fuel cell stack;
an evaporator for producing a mixed fuel of a raw fuel as the fuel gas chiefly containing hydrocarbon and water vapor obtained by evaporating the water; and
a reformer for producing a reformed gas by reforming the mixed fuel;
a fuel gas supply apparatus for supplying the fuel gas to the fuel cell module;
an oxygen-containing gas supply apparatus for supplying the oxygen-containing gas to the fuel cell module;
a water supply apparatus for supplying water to the fuel cell module;
a power converter for converting direct current electrical energy generated in the fuel cell module to electrical energy according to requirements specification; and
a control device for controlling a power generation amount of the fuel cell module by controlling the fuel gas supply apparatus, the oxygen-containing gas supply apparatus and the water supply apparatus to execute the operation method, the operation method comprising:
a first step of determining, at the control device, a target power generation amount of the fuel cell module in response to a reduction in load of the fuel cell system;
a second step of increasing a flow rate of the oxygen-containing gas supplied to the fuel cell module from the oxygen-containing gas supply apparatus;
a third step of reducing the power generation amount of the fuel cell module after the second step is started;
a fourth step of reducing a flow rate of the fuel gas supplied to the fuel cell module from the fuel gas supply apparatus after the third step is started;
a fifth step of reducing a flow rate of the water supplied to the fuel cell module from the water supply apparatus after the fourth step is started;
a sixth step of reducing the flow rate of the oxygen-containing gas supplied to the fuel cell module from the oxygen-containing gas supply apparatus after the fifth step is started; and
a seventh step of detecting whether the power generation amount of the fuel cell module reaches the target power generation amount or less after the sixth step is started,
wherein the flow rate of the fuel gas is monotonically reduced between the second step where the flow rate of the oxygen-containing gas has been increased and of the sixth step where the flow rate of the oxygen-containing gas has been reduced.

2. An operation method according to claim 1, wherein, in the second step, the flow rate of the oxygen-containing gas supplied to the fuel cell module is increased continuously or step by step.

3. An operation method according to claim 1, wherein, in the third step, when it is determined that the temperature of the fuel cell stack is within a predetermined temperature range, the power generation amount of the fuel cell module is reduced.

4. An operation method according to claim 1, wherein, in the third step, the power generation amount of the fuel cell module is reduced continuously or step by step.

5. An operation method according to claim 1, wherein, in the fourth step, the flow rate of the fuel gas supplied to the fuel cell module is reduced when it is determined that a fuel utilization ratio of the fuel cell module is within a predetermined range based on at least one of the flow rate of the fuel gas supplied to the fuel cell module and electrical current of the fuel cell module.

6. An operation method according to claim 1, wherein, in the fourth step, the flow rate of the fuel gas supplied to the fuel cell module is reduced continuously or step by step.

7. An operation method according to claim 1, wherein, in the fifth step, the flow rate of the water supplied to the fuel cell module is reduced when it is determined that carbon deposition does not occur in the fuel cell module based on at least one of the flow rate of the fuel gas supplied to the fuel cell module, the flow rate of the water supplied to the fuel cell module, the temperature of the evaporator and the temperature of the reformer.

8. An operation method according to claim 1, wherein, in the fifth step, the flow rate of the water supplied to the fuel cell module is reduced continuously or step by step.

9. An operation method according to claim 1, wherein, in the sixth step, the flow rate of the oxygen-containing gas supplied to the fuel cell module is reduced when it is determined that the temperature of the fuel cell stack is within a predetermined temperature range.

10. An operation method according to claim 1, wherein, in the six step, the flow rate of the oxygen-containing gas supplied to the fuel cell module is reduced when it is determined that air depletion does not occur in the fuel cell module based on at least one of the flow rate of the oxygen-containing gas supplied to the fuel cell module, the flow rate of the fuel gas supplied to the fuel cell module and electrical current of the fuel cell module.

11. An operation method according to claim 1, wherein, in the sixth step, the oxygen-containing gas supplied to the fuel cell module is reduced continuously or step by step.

12. An operation method according to claim 1, wherein, in the seventh step, when it is determined that the power generation amount exceeds the target power generation amount, the process returns to the second step.

13. An operation method according to claim 1, wherein, the fuel cell module is a solid oxide fuel cell module.

* * * * *